United States Patent [19]
Bowers

[11] Patent Number: 5,454,412
[45] Date of Patent: Oct. 3, 1995

[54] TRACTION ENHANCEMENT DEVICE FOR MOTOR VEHICLE TIRES

[76] Inventor: Stanley S. Bowers, 4124 Brandon, Howell, Mich. 48843

[21] Appl. No.: 243,500

[22] Filed: May 16, 1994

[51] Int. Cl.$^6$ .................................................. B60C 27/02
[52] U.S. Cl. ...................... 152/221; 152/208; 152/213 R
[58] Field of Search .................................. 152/237, 239, 152/208, 221, 213 R

[56] References Cited

U.S. PATENT DOCUMENTS

| | | | |
|---|---|---|---|
| 1,854,616 | 4/1932 | Lowe | 152/221 |
| 2,058,799 | 10/1936 | Jacks | 152/221 |
| 2,085,204 | 6/1937 | Sullivan | 152/221 |
| 2,107,517 | 2/1938 | Bishop | 152/237 |
| 2,224,074 | 12/1940 | Boyer | 152/237 |
| 2,597,160 | 5/1952 | McGuinness | 152/237 |
| 2,638,953 | 5/1953 | Mulholland | 152/237 |
| 3,092,163 | 6/1963 | Bunker, Jr., et al. | 152/221 |
| 3,192,983 | 7/1965 | Dalton et al. | 152/237 |
| 3,314,466 | 4/1967 | Robinson | 152/237 |
| 3,768,534 | 10/1973 | Gower | 152/239 |
| 4,074,741 | 2/1978 | Moore et al. | 152/237 |
| 4,225,082 | 9/1980 | Granryd | 152/208 X |
| 4,334,569 | 6/1982 | Jacob et al. | 152/221 |
| 4,368,769 | 1/1983 | Rookasin | 152/237 X |
| 4,402,357 | 9/1983 | Granryd | 152/216 |
| 4,716,949 | 1/1988 | Lee | 152/216 |

OTHER PUBLICATIONS

Cable Tie Wrap Product of Buchanan Construction Products, Inc., Hackettstown, N.J., Date Unknonwn.

Primary Examiner—Michael W. Ball
Assistant Examiner—Francis J. Lorin
Attorney, Agent, or Firm—Peter D. Keefe

[57] ABSTRACT

A traction enhancement device for vehicle wheels for use in the event of an emergency. The traction enhancement device includes a traction member for being placed across the periphery of the tire of a drive wheel. A first strap is connected with one end of the traction member and is provided with a series of closely spaced ramped serrations. A second strap is connected with the other end of the traction member and is provided with a sleeve for receiving therethrough the ramped serrations portion of the first strap, wherein a detent engages the ramped serrations in a ratchet-type manner so as to permit the first strap to slide in the sleeve in only one direction. The traction member may be provided with an engagement surface having an irregular contour to thereby enhance traction of the tire with respect to the surface in question. In operation, the user very quickly, easily and simply installs the traction enhancement device by threading the first or second strap through any aperture in the drive wheel and then placing the traction member over the tire tread at a convenient location of the tire. The first strap is then inserted into and then pulled through the sleeve until the traction member is reasonably well secured encirclingly with respect to the tire.

8 Claims, 1 Drawing Sheet

1
TRACTION ENHANCEMENT DEVICE FOR MOTOR VEHICLE TIRES

BACKGROUND OF THE INVENTION

1. Field of the invention

The present invention relates to devices which are installed on motor vehicles to increase the traction of the ties thereof. More particularly, the present invention relates to a traction device of the aforesaid class which is simply and easily installed in the event of an emergency when the motor vehicle is stuck with respect to a slippery or otherwise low traction surface.

2. Description of the Prior Art

Motor vehicles are able to negotiate surfaces provided the tires have sufficient traction. Ordinarily, this is not a problem on dry or wet pavement. However, winter snow and ice may cause pavement to become extremely slick, whereupon the tires of the drive wheels of the vehicle may be unable to gain sufficient friction to allow the motor vehicle to move off from the slick area, thereby resulting in the motor vehicle becoming stuck. On occasions when a motor vehicle is driven on surfaces that are not paved, the soil may be loose and not provide adequate traction, such as may happen in very sandy areas. Or, the unpaved surface may become soggy after a heavy rain, whereupon the tires of the drive wheels may become stuck. These conditions are most apt to happen to rear wheel drive vehicles, but they may also happen to all wheel drive vehicles. Further, these conditions can arise even if the periphery of the tires is provided with an aggressive tread. Accordingly, it would be beneficial to provide some form of auxiliary traction device to the tires of the drive wheels should an untoward situation occur wherein the vehicle has become stuck.

In the prior art, this problem has been addressed with more or less success. For example, U.S. Pat. Nos. 1,854,616, 2,058,799, 2,085,204 and 4,334,569 disclose a traction enhancing member which is placed transversely across the periphery of the tire of a drive wheel and then secured thereto by straps emanating from opposing sides of the traction enhancing member threading through the wheel and being tightly secured by a buckle means.

While prior art traction devices do provide enhanced traction for the ties of drive wheels, they are not simple and easy to install because, among other possible facets, the difficulty and/or inconvenience of securing the buckle means.

It is known to provide strap-like fasteners having a first end portion with is provided with ramped serrations and the other end thereof provided with a sleeve into which the first end portion is inserted. A detent located in the sleeve ratchetingly engages the ramped serrations to allow the first end portion to insert into, but not withdraw from, the sleeve. These devices are sometimes referred to as "tie wrap" fasteners, and are used commonly to secure electrical wiring and other items to objects, and to close the openings of trash bags.

What remains needed is a traction enhancement device which is so simple and easy to use that a mechanically uninclined driver with little or no instruction could use it in the event of an emergency.

SUMMARY OF THE INVENTION

The present invention is a traction enhancement device which is installable by operation of a ratchet mechanism for providing simple, fast and effective use in the event of an emergency.

2

The traction enhancement device includes a traction member which is structured to be placed transversely across the periphery of the tire of a drive wheel. A first strap is connected with one end of the traction member and is provided with a series of closely spaced ramped serrations. A second strap is connected with the other end of the traction member and is provided with a sleeve for receiving therethrough the ramped serrations portion of the first strap, wherein a detent engages the ramped serrations in a ratchet-type manner so as to permit the first strap to slide in the sleeve in only one direction.

The traction member may be provided with an engagement surface having an irregular contour which serves to enhance traction of the tire with respect to the surface in question. Preferably, the traction enhancement device is dimensioned and fabricated for being easily stored in a small volume of space, suitable for placement in a glove compartment, or tucked out of the way in the trunk.

In operation, the user very quickly, easily and simply installs the traction enhancement device by threading the first or second strap through any aperture in the drive wheel and then placing the traction member over the tire tread at a convenient location of the tire. The first strap is then inserted into and then pulled through the sleeve until the traction member is reasonably well secured encirclingly with respect to the tire. One or more traction enhancement devices may be placed on any or all the drive wheels, as may be appropriate to the situation at hand.

Accordingly, it is an object of the present invention to provide a traction enhancement device for the tires of a motor vehicle which is very simple and easy to install.

It is an additional object of the present invention to provide a traction enhancement device for the tires of a motor vehicle which is installed by operation of a simple yet effective ratchet mechanism.

These, and additional objects, advantages, features and benefits of the present invention will become apparent from the following specification.

DETAILED DESCRIPTION OF THE PREFERRED EMBODIMENT

Figure 1:
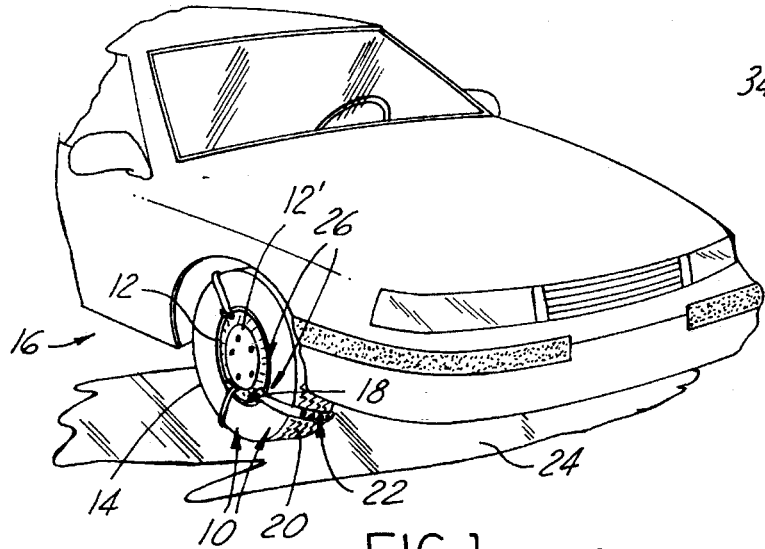
FIG. 1 is a perspective view of the traction enhancement device according to the present invention, shown in operation with respect to the tire of a drive wheel of a motor vehicle which has encountered a slippery road surface.

Referring now to the Drawing, FIG. 1 shows the traction enhancement device 10 according to the present invention installed on a drive wheel 12 and its tire 14 of a motor vehicle 16. It will be seen from FIG. 1 that the traction enhancement device 10 is elongate, passes through an aperture 18 in the wheel 12, which may or may not involve removal of the hubcap 12', and cross-sectionally encircles the tire 14 transversely with respect to the periphery 20 thereof. The portion of the traction enhancement device 10 which lays upon the periphery 20 is a traction member 22 having a structure predetermined to engage the surface 24 in a manner which improves traction of the tie 14. Accordingly, as the tire 14 rotates, the traction member 22 grips the surface 24 by frictional and/or scraping engagement therewith, thereby enhancing traction of the tire with respect to the surface. The traction enhancement device 10 is advantageously equipped with a ratcheting connection member 26 which allows simple, easy and rapid installation by any driver.

With attention now being additionally directed to FIGS. 2 through 5, the structure and function of the traction enhancement device 10 will be detailed with greater specificity.

Figure 3:
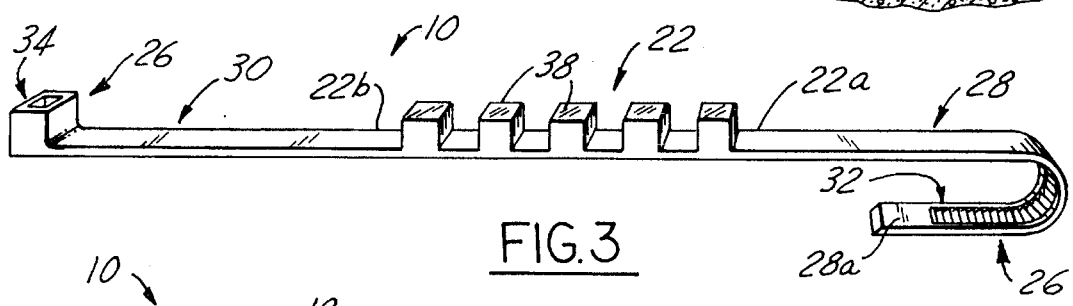
FIG. 3 is a perspective view of the traction enhancement device according to the present invention.

As can be seen in FIG. 3, the traction enhancement device 10 is composed of the aforementioned traction member 22, a flexible first strap 28 connected with one end 22a of the traction member, and a flexible second strap 30 connected with the other end 22b of the traction member.

Figure 5:
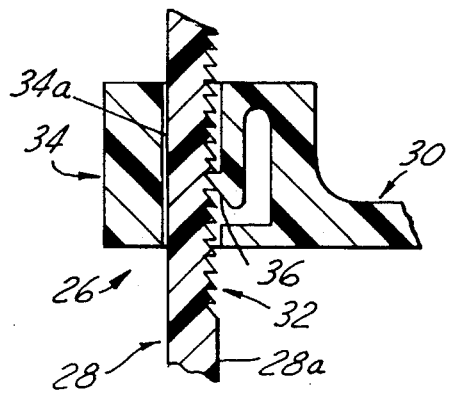
FIG. 5 is a sectional side view of the ratchet mechanism of the traction enhancement device according to the present invention.

The first and second straps 28, 30 mutually engage each other via the aforementioned ratcheting connection member 26 which is structured in the form of a known type which, as noted hereinabove, is commonly used in the fastener art. For example in this regard, a side 28a of the first strap 28 is provided with a series of closely spaced, saw tooth shaped, ramped serrations 32. In this regard further, the second strap 30 is provided, preferably at its end 30a, with a sleeve 34 which has an opening 34a dimensioned to receive therethrough the first strap 28. A detent 36 is biasably mounted to the sleeve and located therewithin. The detent 36 is structured to biasably engage the serrations 32 in a ratcheting manner as they pass thereby. In this regard for example, as shown in FIG. 5, the detent 36 is ramped facing the inclined face of the ramps of the ramped serrations 32 to thereby slide thereover when the first strap 28 is moved into the sleeve 34, but is locked abuttably against the perpendicular face of the ramps when the first strap is moved withdrawingly from the sleeve. Accordingly, the first strap 28 may be placed into and passed through the sleeve 34 in only one direction, that is, the first strap can be inserted into the sleeve, but once the ramped serrations 32 engage the detent 36, the first strap cannot be reversed out of the sleeve.

Figure 4:
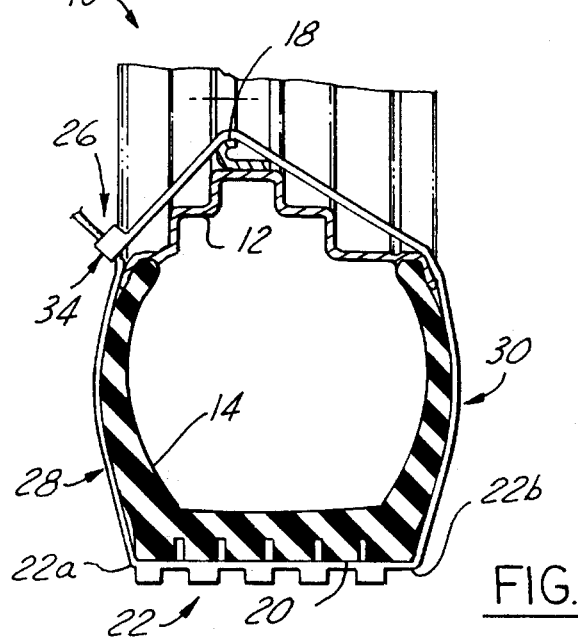
FIG. 4 is a partly sectional side view of the traction enhancement device installed on a tie and wheel of a motor vehicle.

The traction member 22 is preferably flexible and preferably has a length that provides for its placement transversely across all or substantially all the periphery 20 of a tire 14, as shown generally in FIG. 4. The width of the traction member 22 is not critical, but for strength and performance purposes, the width should be sufficient to provide adequate frictional and/or scraping force with the problem surface being encountered as the tire rotates with respect thereto. In this regard, it is preferred for the width of the traction member to exceed the width of either of the first and second straps. For example, the traction member 22 and the first and second straps 28, 30 may be of the same or similar width, on the order of between one-quarter and one-half inch, or the traction member may be considerably wider than the first and second straps, for example on the order of one inch or more. The width of the first and second straps 28, 30 is preferred to be kept to a minimum in that this will facilitate placement of the first or second strap threadingly through a selected aperture 18 in the wheel 12. The thickness of the traction member 22 may be the same or different from that of the first and second straps 28, 30. In this regard, it should be noted that the thicker the traction member 22 is, the greater should be its sliding friction and/or scraping force with respect to the surface supporting the periphery of the tire as the tire rotates with respect thereto. For example, the traction member may be one-half inch thick while the first and second straps may be one-quarter inch thick. In this regard, the traction member 22 is preferably provided with an engagement surface having an irregular contour, such as by being provided with studs 38, as shown in FIG. 3, or with ribs or other surface textures which serve to provide increased friction and/or scraping action with respect to the surface 24 to thereby increase grippage of the time therewith. Selected shapes and sizes of traction devices may be provided which are intended for use with certain size ranges, and certain types of, tires.

The preferred construction of the traction enhancement device 10 is as an integral single piece, but this is not a requirement. The preferred material of construction is rubber, an elastomer, or a plastic having flexibility and sufficiently high tensile strength to withstand the frictional and/or scraping force generated by the tire rotating with respect to the surface for a duration at least sufficient to get the vehicle out of the problem area. In this regard, the selected material need not be so structurally rigorous as to be highway drivable when installed. Indeed, in the ordinary operation of the traction enhancement device 10, once the vehicle becomes free, normal driving for a short distance will break any or all of the the first strap, second strap, or the traction member, thus sparing the driver the need to again get out of the car to cut off the traction enhancement device 10, and thereby avoid any consequent danger or hazard that this might otherwise entail.

In a variation of the sleeve 34, the opening 34a may be a little oversized which would allow a pick or screwdriver to access the detent and cause it to disengage from the plurality of serrations 32 to thereby allow the first strap 28 to be withdrawn from the sleeve. Again, this structural configuration is presently known in the fastener art and needs no further elaboration.

Figure 2:
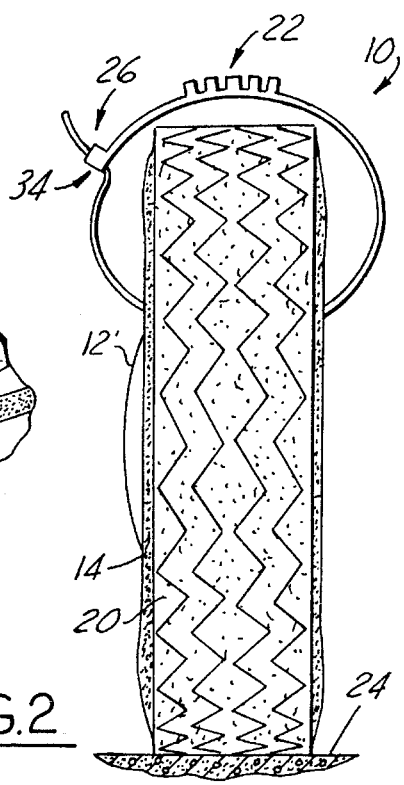
FIG. 2 is a side view of the traction enhancement device according to the present invention, shown being installed on the tire and wheel of a motor vehicle.

In operation, when a driver encounters a surface in which he or she finds the vehicle stuck, the driver obtains one or more of the traction enhancement devices from a storage location in the vehicle and then proceeds to mount one or more thereof to the driving wheels affected. Mounting is performed by first locating a suitable aperture through the wheel. In the event the hubcap prevents the use of an aperture, the hubcap should be removed. The driver then places either the first or second strap through the aperture while preliminarily aligning the traction member across the periphery (that is, the threaded surface) of the tire. With the traction enhancement device being formed loosely in a cross-sectional encirclement of the tire via the wheel aperture, the first strap is threaded through the sleeve, as shown in FIG. 2. The driver then pulls on the first strap with one hand while holding the sleeve with the other; it may be possible in some circumstances to even perform this with one free hand. The first strap should be pulled so that the traction enhancement device is reasonably tight on the tire. Then another location on that tire is next provided with the traction enhancement device, and/or one or more other tires are so provided, as needed. The driver then causes the drive wheels to rotate at a speed reasonably calculated to cause extrication from the problem surface area. Once extrication has been achieved, the driver may either remove the one or more traction enhancement devices, or the driver may simply drive off with the expectancy that soon, and safely, any traction enhancement devices connected to the tires will fail and thereupon be lost from the vehicle.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A traction enhancement device for a tire of a vehicle, the tire being mounted to a rim of a wheel, the tire having a periphery for providing rollable contact with a surface supporting the periphery, said traction enhancement device comprising:

an elongated singular piece of flexible material, comprising:

a traction member having a first end and an opposite second end, said traction member having an engagement surface located between said first and second ends, said engagement surface having irregular contour means for grippably engaging a surface in contact therewith;

a first strap integrally connected with said first end of said traction member, said first strap having a first side and an opposite second side; and a second strap integrally connected with said second end of said traction member; and ratcheting connection means for ratchetably connecting said first strap to said second strap, wherein said ratchet connection means comprises:

said first strap having a series of ramped serrations on at least said first side thereof; and said second strap having a sleeve connected thereto, said sleeve being dimensioned to slidably receive thereinto said first strap, said sleeve being provided with a detent, said detent engaging said series of ramped serrations to thereby cause said first sleeve to slide in only one direction with respect to said sleeve;

wherein said first strap, said second strap and said traction member are structured to collectively cross-sectionally encircle a tire and the rim of a wheel to which the tire is mounted so that said engagement surface is adjacent to and faces directly away from the periphery of the tire, said ratcheting connection means ratchetably connecting said first strap to said second strap to thereby secure said traction member to the periphery of the tire.

2. The traction enhancement device of claim 1, wherein said irregular contour means comprises a plurality of mutually spaced protuberances.

3. The traction enhancement device of claim 2, wherein said protuberances comprise studs.

4. The traction enhancement device of claim 1, wherein said traction member has a first width, said first strap has a second width and said second strap has a third width, wherein said first width is greater than either of said second and third widths.

5. The traction enhancement device of claim 1, wherein said elongated flexible piece of material is composed of a plastic having a structure predetermined to provide disposable detachment from the tire after a predetermined period of driving on a road surface.

6. The traction enhancement device of claim 5, wherein said irregular contour means comprises a plurality of mutually spaced protuberances.

7. The traction enhancement device of claim 6, wherein said protuberances comprise studs.

8. The traction enhancement device of claim 7, wherein said traction member has a first width, said first strap has a second width and said second strap has a third width, wherein said first width is greater than either of said second and third widths.

* * * * *